US012599993B2

(12) United States Patent
Lenain et al.

(10) Patent No.: US 12,599,993 B2
(45) Date of Patent: Apr. 14, 2026

(54) ORBITAL FRICTION WELDING METHOD OF A BLADE TO A STUB ON A TURBOMACHINE ROTOR DISC

(71) Applicant: SAFRAN AERO BOOSTERS, Herstal (BE)

(72) Inventors: Astrid Lenain, Herstal (BE); Charly Mougel, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/640,114

(22) Filed: Apr. 19, 2024

(65) Prior Publication Data

US 2024/0351151 A1     Oct. 24, 2024

(30) Foreign Application Priority Data

Apr. 21, 2023    (BE) ................................... 2023/5300

(51) Int. Cl.
B23P 15/04     (2006.01)
B23K 20/12     (2006.01)
B23K 101/00     (2006.01)

(52) U.S. Cl.
CPC ............ B23P 15/04 (2013.01); B23K 20/129 (2013.01); B23K 2101/001 (2018.08)

(58) Field of Classification Search
CPC ..... B23P 15/04; B23K 20/219; B23K 20/127; B23K 2101/001; B21K 25/005
See application file for complete search history.

(56) References Cited

U.S. PATENT DOCUMENTS

| | | | | |
|---|---|---|---|---|
| 3,982,854 A | * | 9/1976 | Berry | B23P 15/04 416/213 R |
| 5,858,142 A | * | 1/1999 | Tully | B23K 20/121 228/114.5 |
| 6,095,402 A | * | 8/2000 | Brownell | B23K 20/129 228/119 |
| 8,651,361 B1 | * | 2/2014 | Daroff | B23K 20/12 228/114.5 |
| 9,194,245 B2 | * | 11/2015 | Wlasowski | B23K 20/12 |
| 10,583,521 B2 | * | 3/2020 | Richter | B23P 15/04 |
| 2003/0141344 A1 | * | 7/2003 | Foster | B23K 20/129 228/114.5 |
| 2009/0113708 A1 | * | 5/2009 | Bamberg | B23K 20/16 29/889.21 |
| 2009/0173769 A1 | * | 7/2009 | Bray | B23K 20/129 228/112.1 |
| 2009/0314823 A1 | * | 12/2009 | Bray | B23K 20/1205 228/112.1 |

(Continued)

FOREIGN PATENT DOCUMENTS

EP          2535516          12/2012

*Primary Examiner* — Jason L Vaughan
(74) *Attorney, Agent, or Firm* — RANKIN, HILL & CLARK LLP

(57)          ABSTRACT

A process for orbital friction welding of a blade to a stub on a turbomachine rotor disk, comprising the following successive phases: friction of the blade against the stub with application of a force friction normal; forging of the blade against the stub with application of a normal forging force; wherein the normal forging force is greater than the normal friction force and essentially constant throughout the forging phase.

15 Claims, 2 Drawing Sheets

(56) References Cited

U.S. PATENT DOCUMENTS

| | | | | |
|---|---|---|---|---|
| 2010/0270359 A1* | 10/2010 | Young | ................... | B23K 31/125 |
| | | | | 228/102 |
| 2011/0005075 A1* | 1/2011 | Trewiler | ............ | B23K 11/3081 |
| | | | | 29/889.1 |
| 2012/0012643 A1* | 1/2012 | Beech | ................... | B23K 20/127 |
| | | | | 228/102 |
| 2017/0246707 A1* | 8/2017 | Bray | .......................... | F01D 5/28 |
| 2018/0029157 A1* | 2/2018 | Bray | .................... | B23K 20/129 |
| 2018/0056437 A1* | 3/2018 | Bray | ...................... | B23K 20/12 |
| 2018/0209281 A1* | 7/2018 | Boswell | ................... | F01D 5/025 |
| 2018/0371594 A1* | 12/2018 | Raghavan | ............ | B23K 26/356 |
| 2019/0375044 A1* | 12/2019 | Walpole | .............. | B23K 20/002 |
| 2020/0001392 A1* | 1/2020 | Fujita | ................... | B23K 20/121 |

* cited by examiner

ORBITAL FRICTION WELDING METHOD OF A BLADE TO A STUB ON A TURBOMACHINE ROTOR DISC

TECHNICAL AREA

The invention relates to a method of friction welding blades to a turbomachine rotor, and more particularly to a method of orbital friction welding of blades to a turbomachine rotor disk, so as to form a bladed disk for turbomachine.

PRIOR ART

Climate change is a major concern for many legislative and regulatory bodies around the world. Indeed, various restrictions on carbon emissions have been, are or will be adopted by various states. In particular, an ambitious standard applies both to new types of aircraft but also to those in circulation requiring the implementation of technological solutions in order to make them comply with current regulations. Civil aviation has been mobilizing for several years now to make a contribution to the fight against climate change.

Technological research efforts have already made it possible to very significantly improve the environmental performance of aircraft. The Applicant takes into consideration the impacting factors in all phases of design and development to obtain aeronautical components and products that consume less energy, are more respectful of the environment and whose integration and use in civil aviation have moderate environmental consequences with the aim of improving the energy efficiency of aircraft.

Consequently, the Applicant is constantly working to reduce its negative climate impact through the use of methods and the exploitation of virtuous development and manufacturing processes and minimizing greenhouse gas emissions to the minimum possible for reduce the environmental footprint of its activity.

This sustained research and development work concerns new generations of aircraft engines, the reduction of aircraft weight, particularly through the materials used and lightweight on-board equipment, and the development of the use of electrical technologies to ensure propulsion, and, essential complements to technological progress, aeronautical biofuels.

To this end, the invention is the result of technological research aimed at very significantly improving the performance of aircraft and, in this sense, contributes to reducing the environmental impact of aircraft.

In this context, the invention relates to an orbital friction welding process for producing a bladed disk (commonly referred to as: "blisk") or a bladed drum (commonly referred to as "blum") of a turbomachine compressor.

Orbital friction welding is a welding process in which the parts to be assembled are brought into contact under force and welded by a circular movement generally defined by an eccentric, and accompanied by a uniform tangential speed, so as to generate a friction and homogeneous heating at the level of a weld junction between the two parts.

It is also known to use linear friction welding, this is a welding process in which the necessary heat is created by a back and forth movement of the interfaces to be welded. However, orbital friction welding has several advantages over linear friction, for example, the relative movement between the two interfaces is continuous thanks to the circular friction movement, which provides better thermal homogeneity. Unlike linear movement for which the relative speed of the two parts becomes zero at each half-period of oscillation. Additionally, the cycle time of orbital welding is considerably lower than that of linear friction welding (respectively about 2 minutes compared to about 5 minutes).

The published patent document EP 2 535 516 A1 discloses a process for orbital friction welding of blades to a turbomachine rotor, in which, once a material consumption desired is reached, the orbital movement is stopped at a reference position, and a forging force is exerted on the blade against the rotor in order to finalize the weld.

However, the orbital type welding process disclosed by the document has room for improvement. Indeed, this may require better control of the welding parameters in order to avoid structural defects and improve the material health at the welded junction, as well as to improve the precision of the positioning of the blade by relation to the rotor disk.

SUMMARY OF THE INVENTION

Technical Problem

The invention aims to solve at least one of the problems posed by the prior art. More precisely, the invention aims to propose a simple solution making it possible to obtain a weld between the blade and the stub of the rotor disk, which is sound and free from structural defects.

Technical Solution

The subject of the invention is a process for orbital friction welding of a blade to a stub on a turbomachine rotor disk, comprising the following successive phases:
  friction of the blade against the stub with application of a normal friction force;
  forging of the blade against the stub with application of a normal forging force;
  wherein the normal forging force is greater than the normal friction force and essentially constant throughout the forging phase.

Advantageously, the method comprises the application of the normal forging force by means of an actuator receiving a constant force application instruction. Preferably, the actuator belonging to a machine carrying out orbital welding.

According to an advantageous embodiment of the invention, the friction phase comprises a contact phase with a first normal friction force, followed by a material consumption phase with a second normal friction force greater than the first normal friction force.

According to an advantageous embodiment of the invention, the first normal friction force is constant with a tolerance of ±10% during the entire contact phase, and/or the second normal friction force is constant with a tolerance of ±10% during the entire material consumption phase.

According to an advantageous embodiment of the invention, the material consumption starts before the material consumption phase.

According to an advantageous embodiment of the invention, the material consumption phase starts upon reaching a first material consumption equal to at least 0.1 mm.

According to an advantageous embodiment of the invention, the forging phase has a duration greater than a duration of the friction phase.

According to an advantageous embodiment of the invention, the contact phase lasts twice as long as the material consumption phase.

According to an advantageous embodiment of the invention, the second normal friction force corresponds to at least 1.5 times the first normal friction force.

According to an advantageous embodiment of the invention, the normal forging force is higher by at least 50% compared to the second normal friction force.

According to an advantageous embodiment of the invention, the material consumption phase comprises a material consumption speed which remains constant throughout an entire duration of application of the second normal friction force.

According to an advantageous embodiment of the invention, the material consumption speed being between 2 mm/s and 20 mm/s.

According to an advantageous embodiment of the invention, the material consumption phase lasts at most 2 seconds.

According to an advantageous embodiment of the invention, the friction phase comprises an application of an oscillation by orbital movement to the blade, said oscillation being eccentric with respect to the stub.

According to an advantageous embodiment of the invention, the normal forging force is constant with a tolerance of ±10% throughout the forging phase.

The invention also relates to a method of manufacturing a bladed disk for a turbomachine comprising a plurality of blades, each of said blades being welded to a stub on a rotor disk, wherein the welding of the blades to the stubs being a orbital friction welding carried out according to the welding process according to the invention.

The measures of the invention are advantageous in that the welding process ensures better control of the welding parameters so as to optimize the consumption of material and ensure stresses distributed more homogeneously at the junction. This reduces the risk of the presence of metallurgical defects in the welded junction which could lead to cracking or deformation of said junction.

In addition, the welding process of the invention makes it possible to control the maximum thickness of the welded junction after the end of the orbital welding, thus making it possible to obtain a more precise radial height of the welding plane between the blade and the stub.

It is understood that each detail of an embodiment below may be combined with each other detail of the other embodiments.

DETAILED DESCRIPTION OF THE EMBODIMENTS

In the description which follows, the terms "internal" and "external" refer to positioning relative to the axis of rotation of an axial turbomachine. The axial direction corresponds to the direction along the axis of rotation of the turbomachine, the lengths being measured axially. Widths are measured according to circumference. The radial direction is perpendicular to the axis of rotation. Upstream and downstream refer to the main flow direction of the flow in the turbomachine.

The dimensions of the figures are not to scale and in particular the thicknesses or the radial dimensions are exaggerated to facilitate the reading of the figures.

Figure 1:
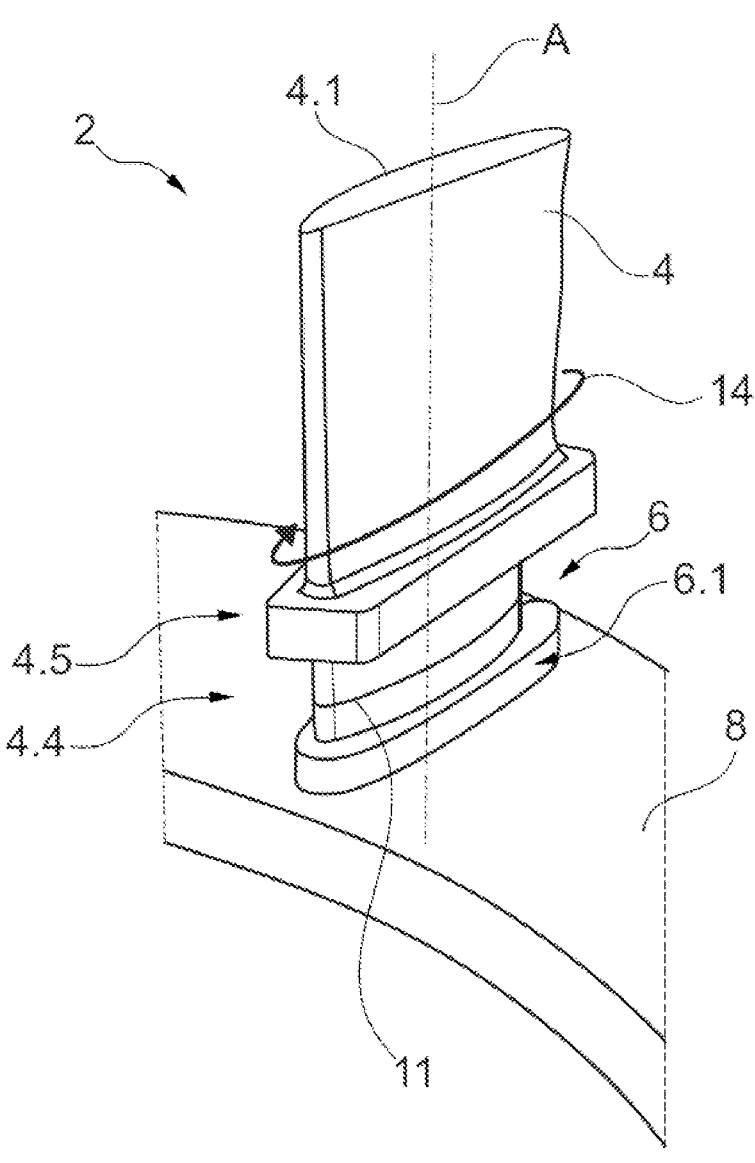
FIG. 1 schematically represents a perspective view, during orbital friction welding of a blade to a stub on a turbomachine rotor disk, said welding being carried out according to the welding method of the invention.

FIG. 1 schematically represents a perspective view, during orbital friction welding of a blade 4 to a stub 6 on a rotor disk 2 of a turbomachine, said welding being carried out according to the welding method of the invention.

The rotor disk 2 comprises an annular row of stubs 6 extending radially externally from an external surface 8 of said rotor disk 2.

The present invention proposes a method of welding the blades 4 to the stubs 6 so as to allow the manufacture of a blisk for a turbomachine. Preferably, the bladed disk is a mobile wheel intended to be placed upstream of an air flow separation nozzle in a turbomachine. For this purpose, the external surface 8 corresponds to an air guiding surface of a fluid stream along the turbomachine.

Alternatively, the blisk may correspond to a drum-type rotor belonging to a high-pressure or low-pressure compressor.

Preferably, the bladed disk is a so-called "bi-material" disk comprising two different titanium alloys. For example, the blades 4 can be manufactured from a Ta6v alloy, and the rotor disk 2 from one of the following alloys: Ti17, Ti575, Ti10.2.3.

Advantageously, the mixture of the two different titanium alloys (Ta6v and Ti17) presents easier machinability, and makes it possible to achieve a gain in mass compared to a solution based, for example, solely on a Ti17 alloy, this is notably due to a density of Ta6v which is slightly lower than that of Ti17.

Indeed, the Ti17 alloy was preferentially chosen for the disc part for its good fatigue characteristics HCF (English acronym for: "High Cycle Fatigue") and LFC ("Low Cycle Fatigue"). A Ti17 disc will also show a greater margin in burst speed than a Ta6v disc. For the blades, the Ta6v alloy was chosen because it provides the blades with a higher elongation at break (better impact resistance), and better crack propagation behavior which results in better durability to low energy impacts.

The blade 4 is welded to the stub 6 by means of a junction section 11 corresponding to a contact interface during orbital welding. In this regard, the blade 4 is moved in a circular manner around an axis A by an orbital oscillation movement 14, the amplitude and frequency of oscillation of which are controlled by the machine carrying out the orbital welding. Axis A extends radially from a center of the junction section 11 of the stub 6. Preferably, the blade 4 and the stub 6 each comprise the same junction section 11.

Preferably, the orbital oscillation movement 14 is uniform and has an eccentricity corresponding to a tangential gap (coplanar with section 11) between a center of the junction section 11 of the blade 4 and the axis A.

Prior to orbital friction welding by means of the orbital oscillation movement 14, a volume of sacrificial material (extending essentially radially) is provided on each of the blades 4 and the stubs 6 to be assembled. This sacrificial volume is caused to be extruded outside the contact interface between the two junction sections 11, thus forming a burr, commonly designated by: "flash", which will then be eliminated, preferably, by machining, in order to arrive at the final section (corresponding to aerodynamic profile 4.1 of blade 4) to form the bladed disc.

The blade 4 may include a lower end 4.4 provided with a reinforcement 4.5 which will be machined after the welding operation together with a volume 6.1 for reinforcing the stub 6 on the disc 2.

Preferably, the junction section 11 of each of the blades 4 and stub 6 comprises a total surface area greater than or equal to 200 mm$^2$ and less than or equal to 7000 mm$^2$, and more preferably between 2000 mm$^2$ and 3000 mm$^2$.

Section 11 to be welded is then considered to be a "large" section. In this configuration, the tooling carrying out the orbital welding is more mechanically stressed. In addition, the blade 4 and the stub 6 being manufactured using two different titanium alloys, it has been observed that this can be a source of complications for the welded junction, which risks having structural and dimensional defects which could affect the mechanical strength. overall bladed disk.

In this regard, the welding process according to the invention proposes to improve the structural and dimensional quality of the weld between the blade 4 and the stub 6 of the rotor disk 2.

Figure 2:
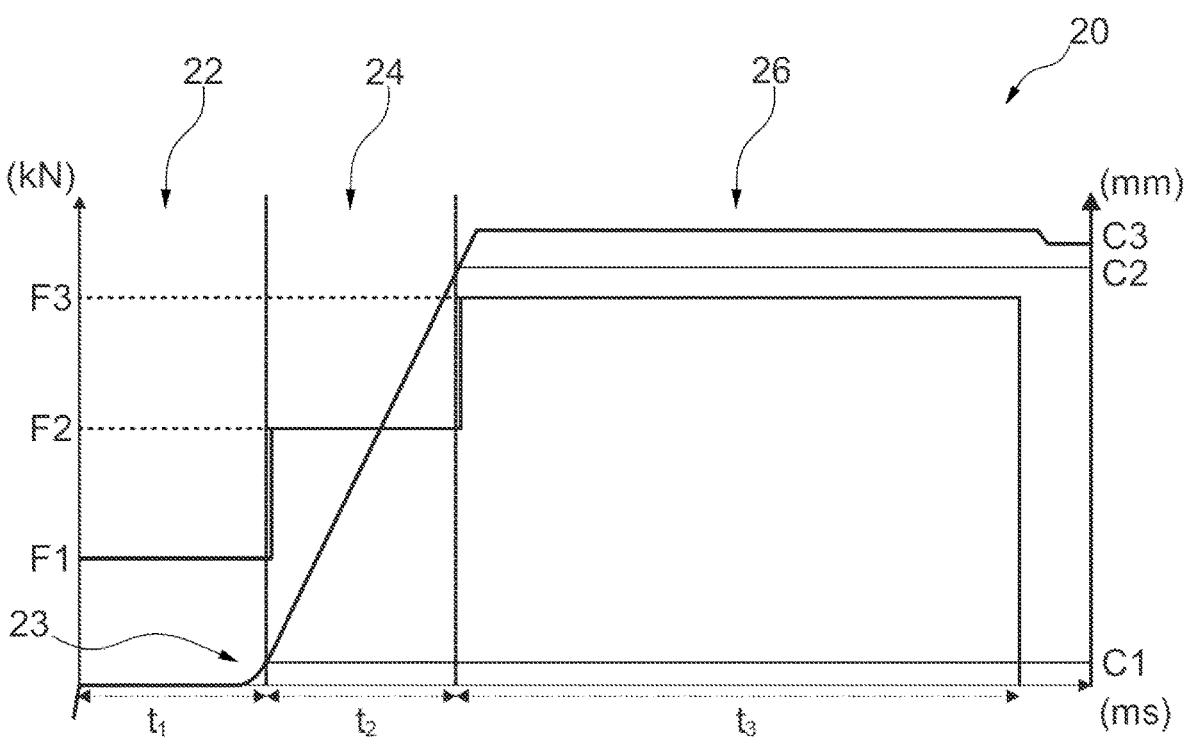
FIG. 2 schematically illustrates a graph representing the evolution of material consumption and different forces during orbital friction welding of the blade to the stub, according to the method of the invention.

FIG. 2 schematically illustrates a graph 20 representing the evolution of material consumption and different forces during orbital friction welding of the blade to the stub.

Graph 20 includes an abscissa axis representing the welding time (in ms) and two ordinate axes corresponding, respectively, to a left axis representing the different normal forces F1, F2 and F3 applied, i.e. whose direction is radial and perpendicular at the junction section and which can be expressed in kN, and at a straight axis representing the material consumption (in mm) between the blade and the stub.

We can distinguish on graph 20, two welding phases corresponding successively to a friction phase 22, 24 of the blade against the stub, and to a forging phase 26 of the blade against the stub.

The friction phase 22, 24 includes the application of oscillation by orbital movement 14 of the blade (visible in FIG. 1). Said friction phase 22, 24 preferably comprises two phases which follow one another, namely: a first contact phase 22 with the application of a first normal friction force F1, followed by a second material consumption phase 24 which includes the application of a second normal friction force F2.

Advantageously, the contact phase 22 ensures uniform heating of the two junction sections of each of the blade and the stub, which makes it possible to optimize the mixing conditions of the material during the phase. consumption 24.

The consumption of material starts, preferably, before the application of the force F2, and therefore before the consumption phase 24, this is visible in part 23 of graph 20. Thus, a first consumption C1 takes place just after the phase contact 22.

Preferably, the first friction force F1 is applied constantly or with a variation tolerance of ±10%, until reaching a predefined value of the first consumption C1, preferably equal to at least 0.1 mm. Thus, the duration $t_1$ of the contact phase 22 corresponds to the time necessary to reach the first consumption C1. Similar to said first force F1, the second friction force F2 is also applied constantly or with a variation tolerance ±10% over an entire duration $t_2$ of the material consumption phase 24 until reaching a second consumption C2 which includes a predefined value corresponding to a setpoint to be achieved. The other parameters (eccentric, frequency, etc.) remain unchanged when applying the friction force F2. This makes it possible to ensure a stabilized regime and a VCA material consumption speed which remains linear throughout the duration $t_2$ of the consumption phase 24.

Indeed, the consumption phase 24 includes a material consumption speed VCA which remains substantially stable and constant throughout the duration of application of the second normal friction force F2.

The duration $t_1$ of the contact phase 22 is greater than the duration $t_2$ of the consumption phase 24. Preferably, duration $t_1$ is approximately equal to twice the duration $t_2$ (the term "approximately" here means ±20% of duration $t_2$). Consumption phase 24 can last between 500 ms and 5 seconds. VCA speed can be between 1 mm/s and 30 mm/s, and is preferably between 2 mm/s and 20 mm/s.

Preferably, the second friction force F2 is greater by at least 50% compared to the first friction force F1, and by at most 400% compared to said force F1. More preferably, the second force F2 corresponds to approximately three times the first force F1. Preferably, the first force F1 is between 10 and 50 kN, and the second friction force F2 is between 30 and 150 kN.

Although the transition from the first force F1 to the second force F2 is illustrated as being incremental, this can last a few ms in order to further smooth the increase in force F1 to reach the second force F2. This makes it possible to guarantee better contact between the blade and the stub, as well as better heat transmission, to ensure homogeneous mixing during the consumption phase 24 which helps to improve the quality of the weld.

We can see in graph 20 that the material consumption phase 24 is followed by the forging phase 26 of the blade against the stub. The latter includes the application of the normal forging force F3 which is greater than the second friction force F2, and preferably greater by at least 50% compared to the second friction force F2, and by at most 400% relative to said force F2. More preferably, the forging force F3 corresponds to approximately three times the second friction force F2, and even more preferably to approximately 3.3 times the second friction force F2. Preferably, the normal forging force F3 is between 90 and 450 kN.

The forging force F3 preferably corresponds to a progressive increase (which may last a few ms) of the second friction force F2, this increase is similar to the transition from the first force F1 to said force F2. In this configuration, the oscillation frequency of the orbital movement is stopped simultaneously at the moment of application of the forging force F3. Preferably, said force F3 is stabilized in an essentially constant manner (the term "essentially" designates a variation of at most ±10% of the force F3, and preferably at most ±5%), for an entire duration $t_3$ of the forging phase 26.

Advantageously, the transition to the forging phase 26 is fluid and makes it possible to gradually slow down the orbital oscillation movement, which therefore makes it possible to reduce the speed of consumption of VCA material. in order to stabilize the material consumption (for a few ms) before stopping completely for the remainder (at least 90%) of the forging duration $t_3$.

The forging duration $t_3$ is greater than the duration $t_1+t_2$ of the friction phase 22, 24. Preferably, the forging duration $t_3$ corresponds to approximately 3 times the duration $t_2$ of the material consumption phase 24. This makes it possible to guarantee a cooling time for the junction under stress (in application of the force F3) which is sufficiently high to compress and effectively cool the two different titanium alloys, and thus control the maximum thickness of the welded junction after the end of orbital welding, which ensures a more precise radial height of the welding plane between the blade and the stub.

Indeed, the high duration of the forging time t 3 as well as the constant application of the forging force F3 makes it possible to ensure stresses distributed more homogeneously at the junction, which reduces the risks of cracking or deformation, thus improving the material health and the structural and dimensional quality of the welded joint.

The forging force F3 is applied constantly until reaching a final consumption C3 which marks the end of the weld parallel to the cessation of the application of the force F3, following which the titanium at the right of the junction is fully recovered from the kneading and forging suffered during welding.

The invention claimed is:

1. A method for orbital friction welding of a blade to a stub on a turbomachine rotor disk, comprising the following successive steps:

orbital friction welding of the blade against the stub with application of a normal friction force; and forging of the blade against the stub with application of a normal forging force, wherein the normal forging force is greater than the normal friction force and essentially constant throughout the forging step, wherein the orbital friction welding step comprises a contact step with a first normal friction force, followed by a material consumption step with a second normal friction force that is greater than the first normal friction force, and wherein the material consumption step starts when a first material consumption is equal to at least 0.1 mm.

2. The method according to claim 1, wherein the first normal friction force is constant with a tolerance of ±10% throughout the contact step, and the second normal friction force is constant with a tolerance of ±10% throughout the material consumption step.

3. The method according to claim 1, wherein material is consumed before the material consumption step.

4. The method according to claim 1, wherein the forging step has a duration greater than a duration of the friction step.

5. The method according to claim 1, wherein the contact step lasts twice as long as the material consumption step.

6. The method according to claim 1, wherein the second normal friction force corresponds to at least 1.5 times the first normal friction force.

7. The method according to claim 1, wherein the normal forging force is higher by at least 50% compared to the second normal friction force.

8. The method according to claim 1, wherein the material consumption step comprises a material consumption speed which remains constant throughout a duration of application of the second normal force friction.

9. The method according to claim 8, wherein the material consumption speed is between 2 mm/s and 20 mm/s.

10. The method according to claim 1, wherein the material consumption step lasts at most 2 seconds.

11. The method according to claim 1, wherein the orbital friction welding step comprises an application of an oscillation by orbital movement to the blade, said oscillation being eccentric relative to the stub.

12. The method according to claim 1, wherein the normal forging force is constant with a tolerance of ±10% throughout the forging step.

13. A method for manufacturing a bladed disk for a turbomachine comprising a plurality of blades, each of said blades being welded to a stub on a rotor disk, wherein the welding of the blades to the stubs is orbital friction welding carried out according to a method for orbital friction welding of a blade to a stub on a turbomachine rotor disk, comprising the following successive steps:

orbital friction welding of the blade against the stub with application of a normal friction force; and forging of the blade against the stub with application of a normal forging force, wherein the normal forging force is greater than the normal friction force and essentially constant throughout the forging step, wherein the orbital friction welding step comprises a contact step with a first normal friction force, followed by a material consumption step with a second normal friction force that is greater than the first normal friction force, and wherein the material consumption step starts when a first material consumption is equal to at least 0.1 mm.

14. The method according to claim 1, wherein the first normal friction force is constant with a tolerance of ±10% throughout the contact step.

15. The method according to claim 1, wherein the second normal friction force is constant with a tolerance of ±10% throughout the material consumption step.

* * * * *